J. F. DEEMS.
OIL FILTER.
APPLICATION FILED JAN. 16, 1908.
966,173.
Patented Aug. 2, 1910.
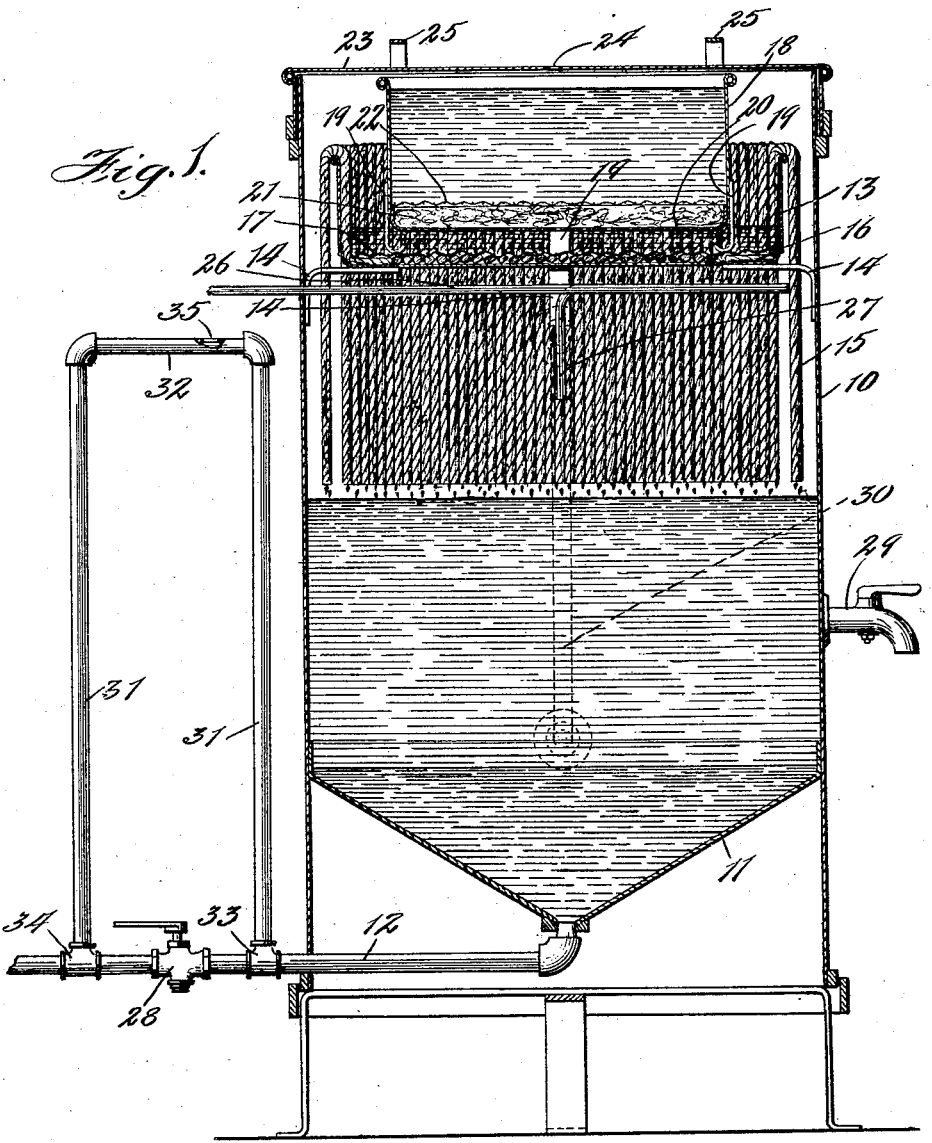

UNITED STATES PATENT OFFICE.

JOHN FRANCIS DEEMS, OF NEW YORK, N. Y.

OIL-FILTER.

966,173.  Specification of Letters Patent.  Patented Aug. 2, 1910.

Application filed January 16, 1908. Serial No. 411,099.

*To all whom it may concern:*

Be it known that I, JOHN FRANCIS DEEMS, a citizen of the United States, residing at New York, in the county of New York and State of New York, have invented certain new and useful Improvements in Oil-Filters, of which the following is a specification.

This invention relates to improvements in filters, particularly adapted for filtering oils and other heavy liquids, and the primary object of the invention is to provide an improved, simple, durable and cheap filter which will be effective and efficient in operation.

A further object is to provide an improved filter of this character which may be readily cleaned.

A further object is to provide improved means for heating the liquid, and improved means for automatically drawing off the water of condensation to prevent the filter from overflowing.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating the embodiment of the invention, and in which—

Figure 1 is a longitudinal sectional view of an improved filter constructed in accordance with the principles of this invention. Fig. 2 is an enlarged detail sectional view showing the manner of holding the wicks in position.

Referring more particularly to the drawing and in the present exemplification of the invention, the numeral 10 designates a tank of any suitable size and configuration, which is preferably provided with a conical bottom 11, tapering toward the diametric center thereof, and 12 designates an outlet pipe which is connected to the bottom 11 for drawing off the water of condensation.

Arranged within the tank 10 and preferably adjacent the top thereof is a receptacle 13, which may be supported in any desired or suitable manner, preferably by means of brackets 14, which are secured to the wall of the tank, and upon which the receptacle 13 rests. This receptacle may be of any desired size and configuration and is of a diameter somewhat less than the internal diameter of the tank 10, and is supported by the brackets 14 in such a position as to form a circumferential space between the outer periphery thereof and the wall of the tank.

One end of suitable wicks 15 is placed within the receptacle 13 so that a portion 16 of the wicks will rest upon the bottom of the receptacle 13 and the body of the wicks extend to the top of the receptacle 13 against the wall thereof and over the top edge 13 and will extend through the circumferential space between the receptacle 13 and the wall of the tank 10 so that the free extremities thereof will depend for any desired distance below the bottom of the receptacle 13 and be suspended above the bottom of the tank 10. A strainer 17 constructed of any suitable reticulated material, such as wire gauze or the like, is placed within the receptacle 13 so as to engage and rest upon the extremities 16 of the wicks 15, which rest upon the bottom of the receptacle 13, and the strainer is of a diameter to extend across the receptacle 13 between the wicks 15. A second receptacle 18 is provided with suitable supporting feet 19, which extend a short distance below the bottom of the receptacle. This second receptacle is preferably of a diameter somewhat smaller than the diameter of the receptacle 13 and is adapted to be inserted into the receptacle 13 so that the supporting feet 19 thereof will engage and rest upon the strainer 17 for holding the latter against displacement and for binding the ends of the wicks between the filter in the bottom of the receptacle 13. The bottom 20 of the receptacle 18 is perforated, and arranged within said receptacle is a suitable filtering pad 21, such as hair felt or the like. This pad may be of any desired thickness and substantially fills the bottom of the receptacle 18, and a screen 22, constructed of any suitable reticulated material, such as wire gauze or the like, is adapted to rest upon the filter pad 21 within the receptacle 18.

The receptacles 13 and 18 are so located as to stand entirely within the tank 10, and a suitable closure 23 provided with a vent opening 24, may be provided for the tank, and if desired, handles 25 may be provided for the closure.

A suitable pipe coil 26 may be provided to heat the oil in cold weather to decrease the density thereof and thereby permit the same to be more rapidly filtered. This coil may be provided with any suitable source of steam supply and is located preferably directly below the bottom of the receptacle 13. The free extremity 27 of the coil preferably depends from the coil so that the water of condensation will drop therefrom into the tank 10 below the receptacle 13.

In use the liquid to be filtered is placed within the receptacle 18 and will percolate through the strainer 22, filter pad 21 and the perforated bottom 20 of the tank and enter the receptacle 13, where it will come in contact with the ends of the wicks 15, which latter will absorb the oil, which will be conducted by capillary attraction to the free ends of the wicks, from which ends the oil will drop into the tank 10.

A suitable faucet 29 may be provided for drawing off the oil and a suitable sight glass 30 may also be provided for ascertaining the amount of oil filtered.

Any suitable means may be provided for preventing the filter from overflowing. A suitable and efficient means for accomplishing this purpose comprises a bypass 31, which comprises spaced legs and a connecting member 32 for connecting one extremity of the legs. The other extremities of the legs are connected to the pipe 12 as at 33, 34, one on each side of the stop cock 28 and the legs of the bypass may be of any desired length to regulate the height of the fluid in the tank 10.

With this construction it will be apparent that when the stop cock 28 is closed and the water of condensation allowed to accumulate in the tank, the bypass 31 will permit the water to flow therethrough and around the stop cock 28, when the column of the water of condensation and oil has reached a sufficient height in the tank, and in order to prevent the bypass 31 from siphoning, a suitable vent opening 35 may be provided in the connecting member 32.

The wicks 15 are held from accidental displacement with relation to the receptacle 13 by means of the weight of the receptacle 18 and the liquid therein resting upon the strainer 17 which binds the ends of the wicks between the strainer and the bottom of the receptacle 13.

What I claim as new and desire to secure by Letters Patent is—

1. In a device of the class described, the combination of a tank, a filter within the tank, a receptacle also within the tank for receiving the liquid from the filter, and removable means for conveying the liquid from the said receptacle and into the tank by capillary attraction, said means being held against displacement by the filter.

2. In a device of the class described, the combination of a tank, a filter within the tank, a receptacle also within the tank for receiving the liquid from the filter, and a wick, a portion of which is located within and rests upon the bottom of the receptacle and another portion extending outside of the receptacle for conveying the liquid from the receptacle and depositing it into the tank by capillary attraction, said filter resting upon a portion of the wick.

3. In a device of the class described, the combination of a tank, a filter within the tank, a receptacle also within the tank for receiving the liquid from the filter, a wick, a portion of which is located in the receptacle and another portion extending outside of the receptacle for conveying the liquid from the receptacle and depositing it into the tank by capillary attraction, and means coöperating with the filter for holding the wick against displacement.

4. In a device of the class described, the combination of a tank, a filter within the tank, a receptacle also within the tank for receiving the liquid from the filter, a wick suspended by the receptacle, a portion of the wick extending into the receptacle and another portion extending outside of the receptacle for conveying the liquid from the receptacle and depositing it into the tank by capillary attraction, and means coöperating with the filter and engaging the portion of the wick within the receptacle for holding the wick against displacement.

5. In a device of the class described, the combination of a tank, a receptacle within the tank and supported above the bottom thereof, a wick, a portion of the wick extending into the receptacle, another portion thereof extending outside of the receptacle, a filter within the receptacle and means whereby the filter will hold the wick against displacement, said receptacle being adapted to receive the liquid from the filter and said wick being adapted to convey the liquid from the receptacle and into the tank by capillary attraction.

6. In a device of the class described, the combination of a tank, a receptacle within the tank and spaced above the bottom thereof, a wick, a portion thereof extending into and resting upon the bottom of the receptacle, another portion of the wick extending outside of the receptacle, a member within the receptacle engaging the portion of the wick which rests upon the bottom of the receptacle, and a filter within the receptacle, supported by the said member for holding the wick against displacement, said receptacle being adapted to receive the liquid from the filter and said wick being adapted to conduct the liquid into the tank by capillary attraction.

7. In a device of the class described, the combination of a tank, a receptacle within the tank spaced above the bottom and the wall thereof, a wick extending over edge of the receptacle and through t between the receptacle and the tank wall and with one portion resting upon the bottom of the receptacle, a perforated member within the receptacle resting upon the wick, and a filter within the receptacle supported by the said member to hold the wick from displacement, said receptacle being adapted to receive the liquid from the filter and said wick being adapted to convey the liquid from the receptacle to the tank by capillary attraction.

8. In a device of the class described, the combination of a tank, a filter within the tank comprising a perforated receptacle, a removable filter pad within the receptacle, a second receptacle also within the tank adjacent the filter receptacle and adapted to receive the liquid therefrom, and means for conveying the liquid from the said second receptacle to the tank by capillary attraction, said means being held from displacement by the filter.

9. In a device of the class described, the combination of a tank, a filter within the tank, a receptacle for receiving the liquid from the filter, means for conducting the liquid from the receptacle to the tank by capillary attraction, said means being held from displacement by the filter, and means for heating the liquid in the said receptacle.

10. In a device of the class described, the combination of a tank, a filter within the tank, a receptacle for receiving the liquid from the filter, means for conducting the liquid from the receptacle to the tank by capillary attraction, said means being held from displacement by the filter, a steam heater for heating the liquid in the receptacle, means for collecting the water of condensation in the tank, and means for drawing the water of condensation from the tank.

11. In a device of the class described, the combination of a tank, a filter within the tank, a receptacle for receiving the liquid from the filter, means for conducting the liquid from the receptacle to the tank by capillary attraction, said means being held from displacement by the filter, a steam heater for heating the liquid in the receptacle, means for collecting the water of condensation in the tank, and means for automatically drawing the water of condensation from the tank.

In testimony whereof I have signed my name to this specification, in the presence of two subscribing witnesses, on this 8th day of January A. D. 1908.

JOHN FRANCIS DEEMS.

Witnesses:
S. F. TAYLOR,
D. A. LILLIS.